United States Patent
Song et al.

(10) Patent No.: US 9,249,358 B2
(45) Date of Patent: Feb. 2, 2016

(54) METHOD AND SYSTEM FOR PRODUCING SYNTHESIS GAS

(71) Applicant: WUHAN KAIDI ENGINEERING TECHNOLOGY RESEARCH INSTITUTE CO., LTD., Wuhan (CN)

(72) Inventors: Kan Song, Wuhan (CN); Manyi Jiang, Wuhan (CN); Qin Sun, Wuhan (CN); Shirong Zhang, Wuhan (CN); Haiqing Zhang, Wuhan (CN); Jinqiao Zhang, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 431 days.

(21) Appl. No.: 13/624,993

(22) Filed: Sep. 24, 2012

(65) Prior Publication Data

US 2013/0019529 A1   Jan. 24, 2013

Related U.S. Application Data

(63) Continuation-in-part of application No. PCT/CN2011/072061, filed on Mar. 23, 2011.

(30) Foreign Application Priority Data

Mar. 23, 2010   (CN) .......................... 2010 1 0132481

(51) Int. Cl.
| | | |
|---|---|---|
| *C01B 3/36* | (2006.01) | |
| *C10B 49/22* | (2006.01) | |
| *C10B 53/02* | (2006.01) | |
| *C10K 1/02* | (2006.01) | |
| *C10K 1/04* | (2006.01) | |
| *C10K 1/06* | (2006.01) | |
| *C10C 5/00* | (2006.01) | |

(52) U.S. Cl.
CPC ................. *C10B 49/22* (2013.01); *C10B 53/02* (2013.01); *C10C 5/00* (2013.01); *C10K 1/026* (2013.01); *C10K 1/04* (2013.01); *C10K 1/06* (2013.01); *C10G 2300/1011* (2013.01); *Y02E 50/14* (2013.01)

(58) Field of Classification Search
CPC .... C10J 2300/0916; C10J 3/506; C10J 3/466; C10J 2300/1207; C10J 2300/1631; C10J 2300/1807; Y02E 50/14; Y02E 50/10
See application file for complete search history.

(56) References Cited

U.S. PATENT DOCUMENTS 5,504,259 A * 4/1996 Diebold et al. ............... 568/697
5,853,548 A * 12/1998 Piskorz et al. .................. 201/7

(Continued)

*Primary Examiner* — Imran Akram
(74) *Attorney, Agent, or Firm* — Matthias Scholl P.C.; Matthias Scholl

(57) ABSTRACT

A method for producing synthesis gas, including: 1) pre-processing a biomass raw material; 2) pyrolyzing the biomass raw material to yield a pyrolysis gas and a carbon powder; 3) separating the pyrolysis gas from the carbon powder and a solid heat carrier; 4) separating the carbon powder away from the solid heat carrier via a solid-solid separator; 5) conveying the generated pyrolysis gas to a condensate tank for spray condensation, condensing a condensable part in the pyrolysis gas to generate biological fuel oil, pressurizing the generated biological fuel oil by a high pressure oil pump and feeding to a gasification furnace to be gasified; and 6) feeding one part of non-condensable pyrolysis gas to a combustion bed to combust with air, and conveying the other part of the non-condensable pyrolysis gas to the pyrolysis bed as a fluidizing medium.

6 Claims, 1 Drawing Sheet

(56) References Cited

U.S. PATENT DOCUMENTS

| | | | |
|---|---|---|---|
| 6,814,940 B1 * | 11/2004 | Hiltunen et al. | 422/141 |
| 2006/0112639 A1 * | 6/2006 | Nick et al. | 48/198.1 |
| 2008/0006519 A1 * | 1/2008 | Badger | 202/96 |
| 2008/0016769 A1 * | 1/2008 | Pearson | 48/197 R |
| 2009/0227766 A1 * | 9/2009 | Bridgwater et al. | 530/202 |
| 2011/0132737 A1 * | 6/2011 | Jadhav | 201/28 |

* cited by examiner

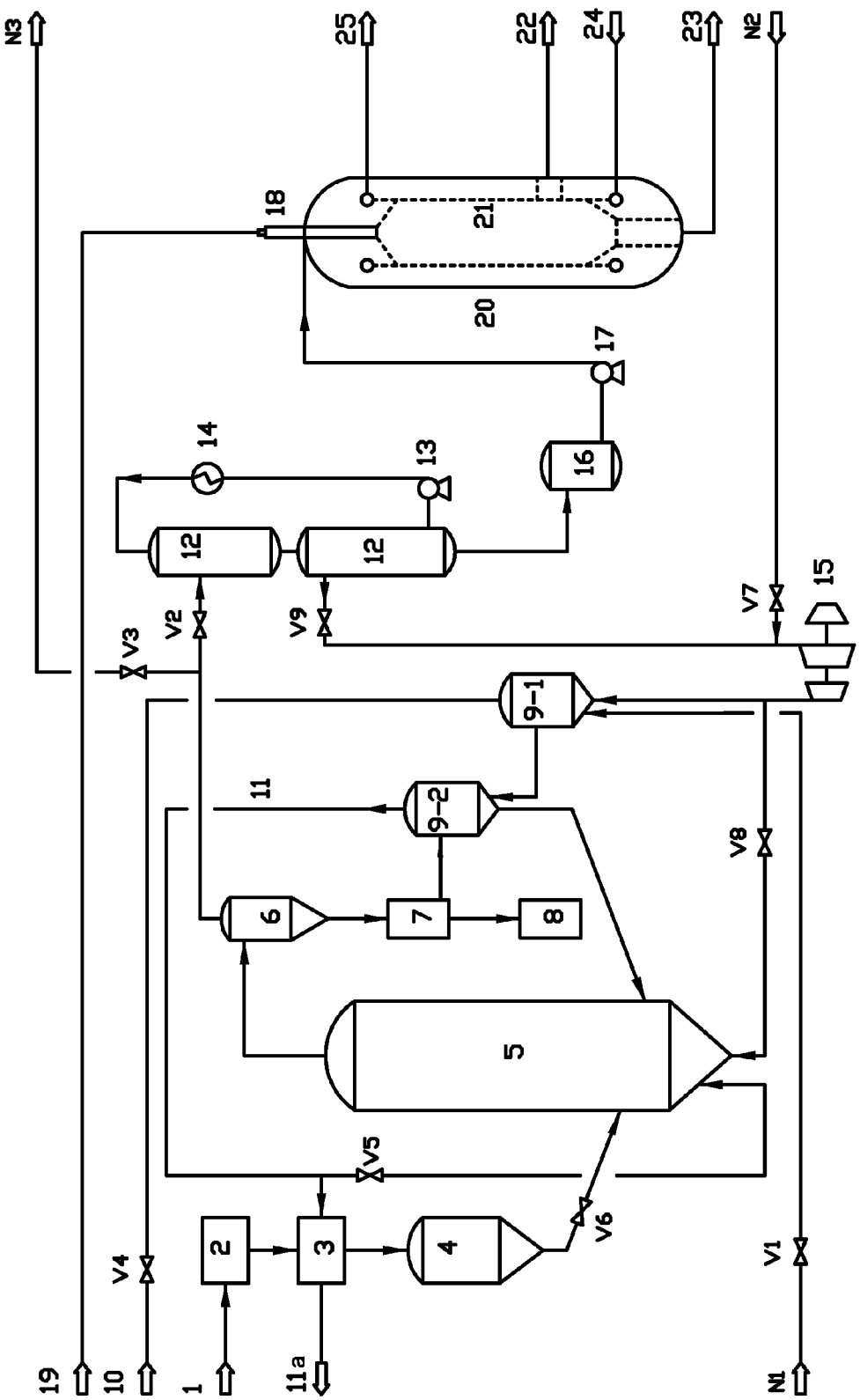

METHOD AND SYSTEM FOR PRODUCING SYNTHESIS GAS

CROSS-REFERENCE TO RELATED APPLICATIONS

This application is a continuation-in-part of International Patent Application No. PCT/CN2011/072061 with an international filing date of Mar. 23, 2011, designating the United States, and further claims priority benefits to Chinese Patent Application No. 201010132481.3 filed Mar. 23, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the production of synthetic gas, and more particularly to a method and a system for producing synthetic gas from biomass by pyrolysis. The method belongs to the technical field of producing synthetic gas or combustible gas by using biomass. The synthetic gas is a mixture gas which contains CO, $H_2$, and a variety of carbohydrates that contain carbon, hydrogen, and oxygen. The synthetic gas produced by the method according to the invention can be used for gas turbine power generation systems, fuel cells, synthetic oil, metallurgical and other systems.

2. Description of the Related Art

As dwindling of traditional fossil fuels (coal, oil, and natural gas) reserves and the environmental pollution problems caused by the use of fossil fuels directly threaten human survival and development, attaching importance to development of renewable and environmental friendly energy has become a consensus of governments of all countries. Biomass, an organic matter generated by plants through photosynthesis, has wide sources and large available quantity. It can be transformed into clean gas or liquid fuel for power generation and producing industrial raw materials and chemical products. As energy it is clean and renewable with zero emission of carbon dioxide and with the potential to fully replace fossil fuels as a new energy resource which has become a priority for all countries.

There are many methods for transforming biomass into clean gas or liquid fuel, among which biomass gasification technology can adapt to a variety of species and has good expansibility. The gasification of biomass is a thermochemical process, i.e., biomass reacts with a gasification agent (such as air, oxygen, vapor, carbon dioxide, etc.) under high temperature to produce a mixed gas consisting of carbohydrate containing carbon, hydrogen, and oxygen. The mixed gas is named synthetic gas. The components of the synthetic gas are decided by the species of used biomass, the type of the gasification agent, the reaction conditions, and the structure of a gasifier used therein. The objectives of gasification is, on the one hand, to minimize the consumption of materials and the gasification agent, as well as the tar content in the synthesis gas, and on the other hand, to maximize the gasification efficiency and the efficiency of carbon conversion, as well as the active ingredient (CO and $H_2$) content in the synthesis gas. The objectives are decided by the type of the used gasifier, the type of the gasification agent, the particle size of the biomass, the gasification pressure and temperature, and moisture and ash of the biomass, etc.

The gasification furnace used in the gasification process can be divided into three classes: fixed bed, fluidized bed, and entrained flow bed. The fixed bed has a simple gasification structure, convenience operation, flexible operation mode, a higher rate of carbon conversion, a wide range of running load which can be between 20% and 110%, and the solid fuel stays in the bed for a long period of time. However, the temperature is nonuniform and it has less efficiency of heat exchange, low heating value of the synthesis gas at the outlet, and the synthesis gas contains a large amount of tar. The fluidized bed is convenient for material addition and ash release, and the temperature is uniform and easy for adjustment. However, it is sensitive to the characteristics of raw materials. If the adhesion, thermal stability, moisture content, or ash melting point of raw materials changes, the operation will become abnormal. Furthermore, in order to ensure normal fluidization of the gasification furnace, it needs to keep lower temperature, and the synthetic gas has a large amount of tar. Since a large amount of tar is produced in the fixed bed and the fluidized bed, a tar cracking unit and purification equipment must be installed, which results in a complicated process. The entrained flow bed has a high and uniform operating temperature, good amplification characteristics, and particularly suitable for large-scale industrialization. Tar is cracked completely. However, the entrained flow bed has a strict requirement on particle size of raw materials. Based on current grinding technology, there is no way to grind biomass having much cellulose to a size suitable for the entrained flow bed. So the entrained flow bed cannot be used for gasification of biomass. Nowadays, tar cracking and pretreatment of biomass prior to gasification are tough problems for the development of biomass gasification.

A typical method for gasifying low tar biomass is summarized below. The method includes pyrolysis and gasification independently, and biomass is transformed into synthetic gas containing low content of tar. In the method, pyrolysis gas and charcoal experience incomplete combustion in the gasifier at around 1000° C., and tar is cracked under high temperature. Although the tar content is decreased greatly, a lot of charcoal is consumed, resulting in a low content of CO produced in the subsequent reduction reaction and a high content of $CO_2$ in the synthetic gas. Secondly, due to a low temperature in the combustion reaction, the temperature at the subsequent reduction becomes lower, and the average temperature in the reduction zone is less than 700° C., and thereby the yield of effective synthetic gas (CO and $H_2$) is decreased significantly (about 30%). Thirdly, the ash and unreacted carbon residue from the reduction reaction is directly discharged, resulting in a low carbon conversion rate. Finally, the gasifier used in the method is in the form of a fixed bed, since the reduction reaction absorbs heat, the temperature difference between the top and the bottom (the top is about 1000° C. and the bottom is about 500° C.) of the bed is huge, which is an inherent disadvantage of fixed bed.

A typical method for producing synthetic gas with carbon-containing materials is described below. The method includes carbonization (or pyrolysis) and gasification independently. In the method, the carbonization temperature is controlled less than 450° F. so as to reduce the tar content resulted from pyrolysis. However, during carbonization stage, solid products are not ground prior to transporting to the reaction coils of the gasifier, which will affect the speed and degree of gasification reaction. Secondly, since the gasification reaction happens in the reaction coil, a large amount of transport gas is needed, but the transport gas will take away a lot of heat during transporting, and thereby the gasification efficiency is low, the temperature is nonuniform, and the subsequent waste heat recovery system is massive. Thirdly, it is not economic that newly-produced synthetic gas is used to provide heat for gasification and carbonization. Fourthly, combustion products (mainly $CO_2$ and $H_2O$) are directly discharged and not fully utilized, resulting in low gasification efficiency. Finally, the ash and unreacted carbon residue in the synthetic gas are also discharged directly, resulting in low carbon conversion rate.

Another typical method for producing synthetic gas from biomass by high temperature gasification is as follows. The method also adopts combination of carbonization and high temperature gasification. However, the method has following problems: firstly, heat of the carbonization furnace is supplied by direct combustion of external combustible gas and oxygen; the introduced high-quality external fuel gas greatly increases the energy consumption of the system; secondly, the adopted pyrolysis gas powder feeding system is complicated; when the high temperature pyrolysis gas is mixed with the low temperature carbon powder and fed into the gasification furnace, the mixture can easily be condensed to form tar, causing blockage and influencing the normal operation; finally, the high pressure charcoal produced in the carbonization furnace is fed into the normal pressure milling machine after being decompressed and cooled, so as to be made into powder, and then the carbon powder is pressurized and fed into the gasification furnace by the pyrolysis gas. The whole process is complicated and high in energy consumption so that the feasibility of the project is bad.

From the above mentioned methods, conventional gasification, whether from biomass or from solid carbon-containing materials, cannot produce synthetic gas with high efficiency and low cost. Although the technology of independent pyrolysis and gasification can adapt to a variety of biomass and reduce the content of tar in synthetic gas, shortcomings such as nonuniform temperature, large investment in equipment for waste heat recovery, high material consumption, low gasification efficiency, and low carbon conversion rate limit the application of biomass gasification in industry. Particularly, there is no effective method for gasifying biomass applied to an entrained flow bed.

SUMMARY OF THE INVENTION

In view of the above-described problems, it is one objective of the invention to provide a method and a system for producing synthetic gas from biomass by pyrolysis that have high efficiency and low cost.

To achieve the above objective, in accordance with one embodiment of the invention, there is provided a method for producing synthesis gas from biomass by pyrolysis comprising steps as follows:

1) pre-processing a biomass raw material: crushing the biomass raw material to have particle sizes of 1-6 mm and drying the raw material till water content is 10-20 wt. %;
2) pyrolyzing the biomass raw material using fast biomass pyrolysis technology, and a product of a pyrolysis bed being a pyrolysis gas and a carbon powder;
3) separating the pyrolysis gas from the carbon powder and a solid heat carrier via a cyclone separator;
4) separating the carbon powder away from the solid heat carrier via a solid-solid separator, feeding the carbon powder to a carbon powder stock bin for collection, heating the solid heat carrier in a carrier heating fluidized bed and conveying the solid heat carrier to the pyrolysis bed for recycling use; conveying a waste heat smoke generated in the carrier heating fluidized bed to dry the biomass raw material of step 1);
5) conveying the generated pyrolysis gas to a condensate tank for spray condensation, condensing a condensable part in the pyrolysis gas to generate biological fuel oil, pressurizing the generated biological fuel oil by a high pressure oil pump and then feeding to the gasification furnace to be gasified; and
6) feeding one part of non-condensable pyrolysis gas to a combustion bed to combust with air, conveying the other part of the non-condensable pyrolysis gas to the pyrolysis bed as a fluidizing medium; controlling the ratio of the non-condensable pyrolysis gas to air and the temperature of the carrier heating fluidized bed in step 6) to make sure that a temperature of the pyrolysis bed is 400-600° C., and a residence time of gas phase in the pyrolysis bed is 0.5-5 s.

In a class of this embodiment, the spray condensation adopts an external circulating method, the biological fuel oil at the bottom of the condensate tank is pressurized and pumped by the oil pump, and the biological fuel oil is returned to the condensate tank for spray condensation after being cooled by an external biological fuel oil heat exchanger; the condensable pyrolysis gas is condensed to generate biological fuel oil, one part of the biological fuel oil is fed to the biological fuel oil tank, and the other part is pressurized by the oil circulating pump and cooled by the biological fuel oil heat exchanger to circularly spray the pyrolysis gas.

In accordance with another embodiment of the invention, there provided is a gasification system for producing synthetic gas from biomass by pyrolysis comprises a biomass material pre-processing part, a pyrolysis part, a condensing part, and a gasification part. The pyrolysis part comprises a pyrolysis bed and a combustion bed; a condensate tank of the condensing part is connected with a non-condensable pyrolysis gas compressor via a pipeline; an output of the non-condensable pyrolysis gas compressor is respectively connected with the pyrolysis bed and the combustion bed; a non-condensable pyrolysis gas is used as a fuel of the combustion bed and a fluidizing medium of the pyrolysis bed.

In a class of this embodiment, the condensing part adopts a spray condensation in external circulation. A lower part of the condensate tank is connected with an oil circulating pump via a pipeline, and the oil circulating pump is connected with the external biological fuel oil heat exchanger; one part of the biological fuel oil is pressurized by the oil circulating pump and cooled by the biological fuel oil heat exchanger, so as to circularly spray the pyrolysis gas, and a lower part of the condensate tank is connected with a biological fuel oil tank.

In a class of this embodiment, the pyrolysis bed is connected with the cyclone separator and the solid-solid separator. The solid-solid separator is connected with the carbon powder stock bin and the carrier heating fluidized bed. A lower part of the carrier heating fluidized bed is provided with a pipeline connected with the pyrolysis bed, so as to convey the heated solid carrier to the pyrolysis bed for recycling use.

In a class of this embodiment, a top part of the carrier heating fluidized bed is connected with a drying system of the biomass material pre-processing part through a waste heat and smoke pipeline, and an upper part of the combustion bed is connected with an air intake pipeline.

In a class of this embodiment, a pipeline connecting an outlet of the biological fuel oil tank and a gasification furnace is provided with the high pressure oil pump, and the biological fuel oil is pressurized and conveyed to the gasification furnace for gasification.

Advantages of the invention are summarized below:

First, the invention adopts fast pyrolysis technology, and can directly transform biomass into biological fuel oil, which improves the volume energy density of the biomass and makes transportation and storage convenient; on the other hand, high energy yield (60-80%) can be realized at the temperature of 400-600° C., which reduces the energy consumption and also can improve the carbon conversion rate of the whole system.

Second, the invention also adopts the technology of heating the cyclic solid heat carrier as heat source of the pyrolysis bed by using the heat generated by combustion of self-produced non-condensable pyrolysis gas. The pyrolysis bed heating technology of the invention has the following three features: 1) the heat needed by the pyrolysis technique is provided by the inner part of the system so as to realize the thermal equilibrium of the system and not to introduce external energy fundamentally; 2) the heat for heating the cyclic solid heat carrier is provided by direct combustion of the non-condensable pyrolysis gas and air. That is to say, the chemical energy of the pyrolysis gas is used, and on the other hand, air, instead of pure oxygen, is used, which greatly reduces the cost of the whole system and increases the use flexibility of the pyrolysis bed; 3) the heated cyclic solid heat carrier is directly conveyed to the pyrolysis bed to contact the raw material, which not only increases the heating efficiency of the pyrolysis bed but also improves the oil yield of the fast pyrolysis reaction.

Third, the invention uses the waste heat smoke generated by combustion of the non-condensable pyrolysis gas to dry the raw material, which improves the energy efficiency of the whole system.

Fourth, the invention does not adopt the process of preprocessing the raw material at the inlet of the gasification furnace. The raw material is directly fed to the gasification furnace after being pressurized by the high pressure oil pump. The process is simple and efficient. The method avoids the technical problem about pneumatic conveying of powder and tar blockage when feeding dry carbon powder, as well as greatly reduces the energy consumption of the inlet raw material and increases the stability, reliability and feasibility of the system.

Fifth, the invention adopts external-cyclic spray condensation. The biological fuel oil heat exchanger is arranged outside the condensate tank, which is convenient for cleaning and maintenance and also avoids stopping for maintenance.

Sixth, the invention adopts the technology of oil pump pressurizing and transportation. The method avoids the technical problem about pneumatic conveying of powder and tar blockage when feeding dry carbon powder, and also increases the stability, reliability and feasibility of the system.

Seventh, with the fast pyrolysis technology, the generated biological fuel oil nearly does not contain coal slag, which saves the trouble of high ash melting point in the process of making synthesis gas from biomass. The follow-up slag discharging system for the gasification furnace is also not needed, which prevents corrosion of alkali metal and ash accumulation and also increases the stability, reliability and feasibility of the system.

In short, the invention aims to realize simplicity, efficiency, energy conservation, economy and high project feasibility. Meanwhile, the invention enhances the gasification efficiency, decreases the amount of effective synthesis gas and improves the energy conversion rate of the system.

BRIEF DESCRIPTION OF THE DRAWINGS

The invention is described hereinbelow with reference to accompanying drawings, in which the sole FIGURE is a schematic diagram of a method and a system for producing synthetic gas from biomass by pyrolysis according to one embodiment of the invention.

DETAILED DESCRIPTION OF THE EMBODIMENTS

For further illustrating the invention, experiments detailing a method and a gasification system for producing synthesis gas from biomass are described below. It should be noted that the following examples are intended to describe and not to limit the invention.

As shown in FIG. 1, a gasification system for producing synthesis gas from biomass comprises a biomass material pre-processing part, a pyrolysis part, a condensing part, and a gasification part. Specifically, the gasification system comprises: a biomass raw material 1, a crushing system 2, a drying system 3, a biomass stock bin 4, a pyrolysis bed 5, a cyclone separator 6, a solid-solid separator 7, a carbon powder stock bin 8, a combustion bed 9-1, a carrier heating fluidized bed 9-2, an air intake pipeline 10 leading to the combustion bed, a waste heat and smoke pipeline 11, a waste heat smoke outlet of the drying system 11a, a condensate tank 12, an oil circulating pump 13, a biological fuel oil heat exchanger 14, a non-condensable pyrolysis gas compressor 15, a biological fuel oil tank 16, a high pressure oil pump 17, a gasification furnace burner 18, an oxygen pipeline 19 leading to the gasification furnace burner, a gasification furnace 20, a water cooling water of gasification furnace 21, a synthesis gas pipeline 22, a coal slag pipeline 23, a desalted and deoxidized water pipeline 24, a saturate water vapor pipeline 25, an external fuel pipeline N1, an air pipeline N2 leading to the combustion bed, and an emptying pipeline N3.

The pyrolysis part comprises the pyrolysis bed 5, the combustion bed 9-1, and the carrier heating fluidized bed 9-2. The pyrolysis bed 5 is connected with the cyclone separator 6 and the solid-solid separator 7. The solid-solid separator 7 is connected with the carbon powder stock bin 8 and the carrier heating fluidized bed 9-2. The lower part of the carrier heating fluidized bed 9-2 is provided with a pipeline connected with the pyrolysis bed 5 so as to convey the heated solid carrier to the pyrolysis bed 5 for recycling use.

The top part of the carrier heating fluidized bed 9-2 is connected with the drying system 3 of the biomass material pre-processing part through the waste heat and smoke pipeline 11. The upper part of the combustion bed 9-1 is connected with an air intake pipeline 10.

The condensate tank 12 of the condensing part is connected with the non-condensable pyrolysis gas compressor 15 via a pipeline. The output of the non-condensable pyrolysis gas compressor 15 is respectively connected with the pyrolysis bed 5 and the combustion bed 9-1. The non-condensable pyrolysis gas is used as the fuel of the combustion bed 9-1 and the fluidizing medium of the pyrolysis bed 5.

The spray condensation adopts an external circulating method. The lower part of the condensate tank 12 is connected with the oil circulating pump 13 via a pipeline. The oil circulating pump 13 is connected with the external biological fuel oil heat exchanger 14. One part of the biological fuel oil is pressurized by the oil circulating pump 13 and cooled by the biological fuel oil heat exchanger 14 so as to circularly spray the pyrolysis gas. The lower part of the condensate tank 12 is connected with the biological fuel oil tank 16.

The pipeline connecting the outlet of the biological fuel oil tank 16 and the gasification furnace 20 is provided with the high pressure oil pump 17. The biological fuel oil is pressurized and conveyed to the gasification furnace 20 for gasification.

A method for producing synthesis gas from biomass by pyrolysis comprises steps as follows:
1) pre-processing the biomass raw material: crushing the biomass raw material to have particle sizes of 1-6 mm and drying the raw material till water content is 10-20 wt. %;
2) pyrolyzing the biomass raw material using fast biomass pyrolysis technology, guaranteeing that the temperature of the pyrolysis bed is at 400-600° C. by adjusting the ratio of the non-condensable pyrolysis gas to air and controlling the temperature of the carrier heating fluidized bed, the residence time of gas phase in the pyrolysis bed is 0.5-5 s and the product of the pyrolysis bed is pyrolysis gas and carbon powder;
3) separating the pyrolysis gas from the carbon powder and the solid heat carrier via the cyclone separator;
4) separating the carbon powder away from the solid heat carrier via the solid-solid separator, feeding the carbon powder to the carbon powder stock bin for collection, heating the solid heat carrier in the carrier heating fluidized bed and then conveying the solid heat carrier to the pyrolysis bed for recycling use;
5) conveying the generated pyrolysis gas to the condensate tank for spray condensation, condensing the condensable part in the pyrolysis gas to generate biological fuel oil, pressurizing the generated biological fuel oil by the high pressure oil pump and then feeding to the gasification furnace to be gasified; and
6) feeding one part of the non-condensable pyrolysis gas to the combustion bed to combust with air, conveying the other part of the non-condensable pyrolysis gas to the pyrolysis bed as the fluidizing medium.

The spray condensation adopts an external circulating method. The biological fuel oil at the bottom of the condensate tank is pressurized and pumped by the oil pump and the biological fuel oil is returned to the condensate tank for spray condensation after being cooled by the external biological fuel oil heat exchanger. One part of the condensable pyrolysis gas is condensed to generate biological fuel oil. One part of the biological fuel oil is fed to the biological fuel oil tank and the other part is pressurized by the oil circulating pump and cooled by the biological fuel oil heat exchanger to circularly spray the pyrolysis gas.

The waste heat smoke generated in the carrier heating fluidized bed in step 2) is used to dry the biomass raw material in step 1) for pre-processing biomass raw material.

Working Process:
1. System Start-Up Process:
1) opening the control valve V3 on the emptying pipeline N3, keeping the control valve V2 leading to the condensate tank 12 and the control valve V9 on the pipeline between the condensate tank 12 and the non-condensable pyrolysis gas compressor 15 closed;
2) opening the control valve V1 on the external fuel pipeline N1 and the control valve V7 on the air pipeline N2 leading to the combustion bed, keeping the control valve V8 on the pipeline between the non-condensable pyrolysis gas compressor 15 and the pyrolysis bed 5 closed so as to feed the heat smoke generated by combustion of fuel and air in the combustion bed 9-1 to the carrier heating fluidized bed 9-2 to heat the solid heat carrier;
3) opening the control valve V5 on the waste heat smoke pipeline between the carrier heating fluidized bed 9-2 and the pyrolysis bed 5 and the control valve V6 on the pipeline between the biomass stock bin 4 and the pyrolysis bed 5 to feed partial waste heat smoke into the drying system 3 to dry the biomass raw material, feeding partial waste heat smoke to the pyrolysis bed 5 as fluidizing medium, separating solid from the mixed pyrolysis gas generated by reaction in the pyrolysis bed 5 via the cyclone separator 6 and then discharging out of the system through the pipeline N3; and
4) opening the control valve V2 after implementing steps 1), 2), and 3) for 10-20 minutes, cooling the pyrolysis gas via spraying of the condensate tank 12, collecting the biological fuel oil; after running for 15-30 min, opening the control valve V9, closing the control valves V1, V5, and V7, opening the control valves V4 and V8 at the same time; the system begins to normally run in the circumstance.

2. Normal Operation Process of System:
The biomass raw material is fed to the drying system 3 via the crushing system 2. The biomass raw material is dried and dehydrated by the heat smoke in the system and then is conveyed to the biomass stock bin 4 for storage. It also can be conveyed to the pyrolysis bed 5 by a feeder.

The product of the pyrolysis bed 5 comprises pyrolysis gas and carbon powder containing CO, $H_2$, $CO_2$, $H_2O$, $CH_4$, and tar. The coarse pyrolysis gas is separated by the cyclone separator 6 and then the solid heat carrier and carbon powder particles in the coarse pyrolysis gas drop in the solid-solid separator 7 via the ash discharging port.

The primarily separated pyrolysis gas is fed to the condensate tank 12 to be circularly sprayed by the biological fuel oil. The non-condensable pyrolysis gas is pressurized in the non-condensable pyrolysis gas compressor 15 and then respectively fed to the combustion bed 9-1 and the pyrolysis bed 5. The condensable pyrolysis gas is condensed to generate biological fuel oil. Part of the generated biological fuel oil can be used for cyclic spray. The rest is generated into biological fuel oil and fed to the biological fuel oil tank 16.

After the solid heat carrier and the carbon powder in the solid-solid separator 7 are separated, the solid heat carrier drops into the carrier heating fluidized bed 9-2 and the carbon powder is fed to the carbon powder stock pin 8.

In the combustion bed 9-1, the non-condensable pyrolysis gas for combustion undergoes combustion reaction with the air from the pipeline 10. The heat smoke generated by combustion is fed to the carrier heating fluidized bed 9-2 to heat the cyclic solid heat carrier. The temperature of the pyrolysis bed 5 is controlled as 400-600° C. by adjusting the ratio of the non-condensable pyrolysis gas generated by combustion to air. The residence time of gas phase in the pyrolysis bed 5 is controlled to be 0.5-5 s. The waste heat smoke passing the carrier heating fluidized bed 9-2 is fed to the drying system 3 for drying.

The pressure of the biological fuel oil in the biological fuel oil tank 16 is first raised to be equal to the working pressure of the gasification furnace 20 by the high pressure oil pump 17 and then it is fed to the gasification furnace burner 18. The oxygen in the pipeline 19 is also fed to the gasification furnace burner 18 to generate high temperature gasification reaction in the gasification 20. The temperature of the synthesis gas 22 at the outlet of the gasification furnace is controlled at 1200-

1600° C. by adjusting the quantity of the oxygen and the heat exchanging amount of the water cooling wall 21 of the gasification furnace filled with desalted and deoxidized water. The gasification product mainly refers to CO and $H_2$ and also comprises a little $CO_2$ and $H_2O$ and trace amount of $CH_4$. The desalted and deoxidized water is cooled by the water cooling wall 21 of the gasification furnace to generate intermediate pressure saturated water vapor, which is fed to the follow-up system through the pipeline 25. The coal slag generated by gasification is discharged via the pipeline 23.

EXAMPLE 1

Take wood as a raw material of biomass. The elemental composition and characteristic data of the dried wood are listed in Table 1.

TABLE 1

Elemental composition and characteristic data of the dried wood

| Items | Symbol | Unit | Value |
|---|---|---|---|
| Carbon | $C_{ar}$ | % (Kg/Kg) | 39.43 |
| Hydrogen | $H_{ar}$ | % (Kg/Kg) | 5.21 |
| Oxygen | $O_{ar}$ | % (Kg/Kg) | 38.36 |
| Nitrogen | $N_{ar}$ | % (Kg/Kg) | 0.15 |
| Sulfur | $S_{ar}$ | % (Kg/Kg) | 0.21 |
| Chlorine | $Cl_{ar}$ | % (Kg/Kg) | 0.00 |
| Ash | $A_{ar}$ | % (Kg/Kg) | 5.00 |
| Moisture | $M_{ar}$ | % (Kg/Kg) | 11.64 |
| Ash fusion point | FT | ° C. | 1436 |
| Low heat value | LHV | MJ/Kg | 14.75 |

The main operating conditions are set as follows:
1) the grain diameter of the material at the outlet of the crushing system 2 is 6 mm;
2) the water content of the material at the outlet of the drying system 3 is 15 wt. %;
3) the pressure of the pyrolysis bed 5 is normal pressure and the temperature is controlled at 400° C.;
4) gas phase residence time of the pyrolysis bed 5 is 5 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) biological fuel quality yield of the biomass raw material fed to the pyrolysis bed 5 is 55%;
2) dry basis content of CO and $H_2$ in the synthesis gas output by the pipeline 22 is 76%; and
3) the carbon conversion rate of the system is 99.9% and the effective oxygen consumption of the synthesis gas is 0.33 mol/mol.

EXAMPLE 2

Take wood in Example 1 as a raw material of biomass (Table 1).

The main operating conditions are set as follows:
1) the grain diameter of the material at the outlet of the crushing system 2 is 5 mm;
2) the water content of the material at the outlet of the drying system 3 is 20 wt. %;
3) the pressure of the pyrolysis bed 5 is normal pressure and the temperature is controlled at 500° C.;
4) gas phase residence time of the pyrolysis bed 5 is 3 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) biological fuel quality yield of the biomass raw material fed to the pyrolysis bed 5 is 60%;
2) dry basis content of CO and $H_2$ in the synthesis gas output by the pipeline 22 is 80%; and
3) the carbon conversion rate of the system is 99.9% and the effective oxygen consumption of the synthesis gas is 0.31 mol/mol.

EXAMPLE 3

Take wood in Example 1 as a raw material of biomass (Table 1).

The main operating conditions are set as follows:
1) the grain diameter of the material at the outlet of the crushing system 2 is 4 mm;
2) the water content of the material at the outlet of the drying system 3 is 10 wt. %;
3) the pressure of the pyrolysis bed 5 is normal pressure and the temperature is controlled at 600° C.;
4) gas phase residence time of the pyrolysis bed 5 is 2 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) biological fuel quality yield of the biomass raw material fed to the pyrolysis bed 5 is 65%;
2) dry basis content of CO and $H_2$ in the synthesis gas output by the pipeline 22 is 82%; and
3) the carbon conversion rate of the system is 99.9% and the effective oxygen consumption of the synthesis gas is 0.31 mol/mol.

EXAMPLE 4

Take wood in Example 1 as a raw material of biomass (Table 1).

The main operating conditions are set as follows:
1) the grain diameter of the material at the outlet of the crushing system 2 is 3 mm;
2) the water content of the material at the outlet of the drying system 3 is 13 wt. %;
3) the pressure of the pyrolysis bed 5 is normal pressure and the temperature is controlled at 450° C.;
4) gas phase residence time of the pyrolysis bed 5 is 1 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) biological fuel quality yield of the biomass raw material fed to the pyrolysis bed 5 is 66%;
2) dry basis content of CO and $H_2$ in the synthesis gas output by the pipeline 22 is 84%; and 3) the carbon conversion rate of the system is 99.9% and the effective oxygen consumption of the synthesis gas is 0.3 mol/mol.

EXAMPLE 5

Take wood in Example 1 as a raw material of biomass (Table 1).

The main operating conditions are set as follows:
1) the grain diameter of the material at the outlet of the crushing system 2 is 2 mm;
2) the water content of the material at the outlet of the drying system 3 is 16 wt. %;
3) the pressure of the pyrolysis bed 5 is normal pressure and the temperature is controlled at 550° C.;
4) gas phase residence time of the pyrolysis bed 5 is 1.5 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) biological fuel quality yield of the biomass raw material fed to the pyrolysis bed 5 is 70%;
2) dry basis content of CO and $H_2$ in the synthesis gas output by the pipeline 22 is 86%; and
3) the carbon conversion rate of the system is 99.9% and the effective oxygen consumption of the synthesis gas is 0.3 mol/mol.

EXAMPLE 6

Take wood in Example 1 as a raw material of biomass (Table 1).

The main operating conditions are set as follows:
1) the grain diameter of the material at the outlet of the crushing system 2 is 1 mm;
2) the water content of the material at the outlet of the drying system 3 is 18 wt. %;
3) the pressure of the pyrolysis bed 5 is normal pressure and the temperature is controlled at 520° C.;
4) gas phase residence time of the pyrolysis bed 5 is 0.5 s; and
5) the pressure of the gasification furnace 20 is controlled to be 4.0 MPa (A) and the temperature is controlled at 1400° C.

According to the set conditions above, the main data and performance parameter of the system in the implementation process of the invention are explained in detail with the attached drawing:
1) biological fuel quality yield of the biomass raw material fed to the pyrolysis bed 5 is 75%;
2) dry basis content of CO and $H_2$ in the synthesis gas output by the pipeline 22 is 90%; and
3) the carbon conversion rate of the system is 99.9% and the effective oxygen consumption of the synthesis gas is 0.285 mol/mol.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing synthesis gas, comprising:
1) pre-processing a biomass raw material;
2) fast pyrolyzing the biomass raw material using a pyrolysis bed having a solid heat carrier to produce a product comprising a pyrolysis gas, a carbon powder, and the solid heat carrier;
3) feeding the product obtained in step 2) to a cyclone separator and separating the pyrolysis gas from the carbon powder and the solid heat carrier;
4) feeding the carbon powder and the solid heat carrier obtained in step 3) to a solid-solid separator and separating the carbon powder from the solid heat carrier;
5) feeding the carbon powder obtained in step 4) to a carbon powder stock bin;
6) feeding the solid heat carrier obtained in step 4) to a carrier heating fluidized bed and heating the solid heat carrier, and conveying the solid heat carrier to the pyrolysis bed for recycling use;
7) conducting spray, condensation with respect to the pyrolysis gas obtained in step 3) by using a condensate tank to produce a biological fuel oil and a non-condensable pyrolysis gas;
8) pressurizing one part of the biological fuel oil obtained in step 7) by using a high pressure oil pump and feeding the one part of the biological fuel oil to a gasification furnace to be gasified; and pressurizing the other part of the biological fuel oil obtained in step 7) by using an oil circulating pump, then cooling the other part of the biological fuel oil by using a biological fuel oil heat exchanger, and then conducting spray condensation with respect to the pyrolysis gas in step 7) by using the other part of the biological fuel oil after cooling thereof; and
9) feeding one part of the non-condensable pyrolysis gas obtained in step 8) to a combustion bed to combust with air, and conveying the other part of the non-condensable pyrolysis gas obtained in step 7) to the pyrolysis bed as a fluidizing medium.

2. The method of claim 1, wherein the spray condensation adopts external circulating method, the one part of the biological fuel oil in step 8) is fed to the biological fuel oil tank before pressurizing the one part of the biological fuel oil in step 8).

3. The method of claim 2, wherein waste heat smoke generated in the carrier heating fluidized bed in step 6) is used to dry the biomass raw material in step 1) for pre-processing the biomass raw material.

4. The method of claim 2, wherein the pre-processing of the biomass raw material in step 1) comprises: crushing the biomass raw material to have particle sizes of 1-6 mm, and drying the raw material till water content is 10-20 wt. %.

5. The method of claim 1, wherein waste heat smoke generated in the carrier heating fluidized bed in step 6) is used to dry the biomass raw material in step 1) for pre-processing the biomass raw material.

6. The method of claim 1, wherein the pre-processing of the biomass raw material in step 1) comprises: crushing the biomass raw material to have particle sizes of 1-6 mm, and drying the raw material till water content is 10-20 wt. %.

* * * * *